United States Patent
Lindholm et al.

(10) Patent No.: US 9,867,148 B2
(45) Date of Patent: Jan. 9, 2018

(54) POWER CONTROL FOR TRANSMISSIONS TO FIRST AND SECOND BASE STATIONS

(71) Applicant: Nokia Solutions and Networks Oy, Espoo (FI)

(72) Inventors: Jari Olavi Lindholm, Palojoki (FI); Kari Juhani Hooli, Oulu (FI); Timo Erkki Lunttila, Espoo (FI); Esa Tapani Tiirola, Kempele (FI); Tommi Koivisto, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/115,366

(22) PCT Filed: Jan. 31, 2014

(86) PCT No.: PCT/EP2014/051913
§ 371 (c)(1),
(2) Date: Jul. 29, 2016

(87) PCT Pub. No.: WO2015/113624
PCT Pub. Date: Aug. 6, 2015

(65) Prior Publication Data
US 2017/0195978 A1 Jul. 6, 2017

(51) Int. Cl.
*H04W 52/34* (2009.01)
*H04W 52/14* (2009.01)
(Continued)

(52) U.S. Cl.
CPC ..... *H04W 52/346* (2013.01); *H04W 52/0219* (2013.01); *H04W 52/146* (2013.01);
(Continued)

(58) Field of Classification Search
CPC ... H04W 52/04; H04W 52/14; H04W 52/146; H04W 52/18; H04W 52/246;
(Continued)

(56) References Cited

U.S. PATENT DOCUMENTS

| | | | |
|---|---|---|---|
| 2012/0178494 A1 | 7/2012 | Haim et al. | 455/522 |
| 2013/0176953 A1* | 7/2013 | Stern-Berkowitz . | H04W 52/146 370/329 |

FOREIGN PATENT DOCUMENTS

| | | |
|---|---|---|
| EP | 2 400 803 A2 | 12/2011 |
| WO | WO-2010050295 A1 | 5/2010 |
| WO | WO 2013/025562 A2 | 2/2013 |

OTHER PUBLICATIONS

3GPP TSG-RAN WG2 Meeting #83, Barcelona, Spain, Aug. 19-23, 2013, R2-132504, "Challenge on UL transmission of dual connectivity", Pantech, 8 pgs.
(Continued)

*Primary Examiner* — Philip Sobutka
(74) *Attorney, Agent, or Firm* — Harrington & Smith

(57) ABSTRACT

A method including receiving at a user equipment first power information for transmitting to a first base station, receiving at the user equipment second power information for transmitting to a second base station, causing said user equipment to transmit to said first base station with a first power less than or equal to a first maximum power dependent on said first power information and causing said user equipment to transmit to said second base station with a second power less than or equal to a second maximum power dependent on said second power information, such that said first and second power does not exceed a total power allowed for said user equipment.

19 Claims, 10 Drawing Sheets

(51) Int. Cl.
    *H04W 52/02*     (2009.01)
    *H04W 52/22*     (2009.01)
    *H04W 52/36*     (2009.01)
    *H04W 52/32*     (2009.01)

(52) U.S. Cl.
    CPC ....... *H04W 52/226* (2013.01); *H04W 52/327* (2013.01); *H04W 52/367* (2013.01)

(58) Field of Classification Search
    CPC ... H04W 52/247; H04W 52/30; H04W 52/34; H04W 52/346; H04W 52/36; H04W 52/367; H04W 72/0413; H04W 72/0473
    USPC ........................................................ 455/522
    See application file for complete search history.

(56) References Cited

OTHER PUBLICATIONS

3GPP TSG RAN WGl #63 Meeting, Jacksonville, USA, Nov. 15-19, 2010, R1-106195, "Remaining issues on uplink power control", Nokia Siemens Networks, Nokia Corporation, 4 pgs.

3GPP TSG-RAN WG2 #84, San Francisco, USA, Nov. 11-15, 2013, Tdoc R2-134234, "Considerations on power control for Dual Connectivity", Ericsson, 4 pgs.

LG Electronics Inc., Management of UE Transmit Power in Dual Connectivity [online], 3GPP TSG-RAN WG2 Meeting #84, 3GPP, Nov. 15, 2013. R2-134048, <URL:http://www.3gpp.org/ftp_ran/WG2_RL2/TSGR2_84/Docs/R2-134048.zip>.

\* cited by examiner

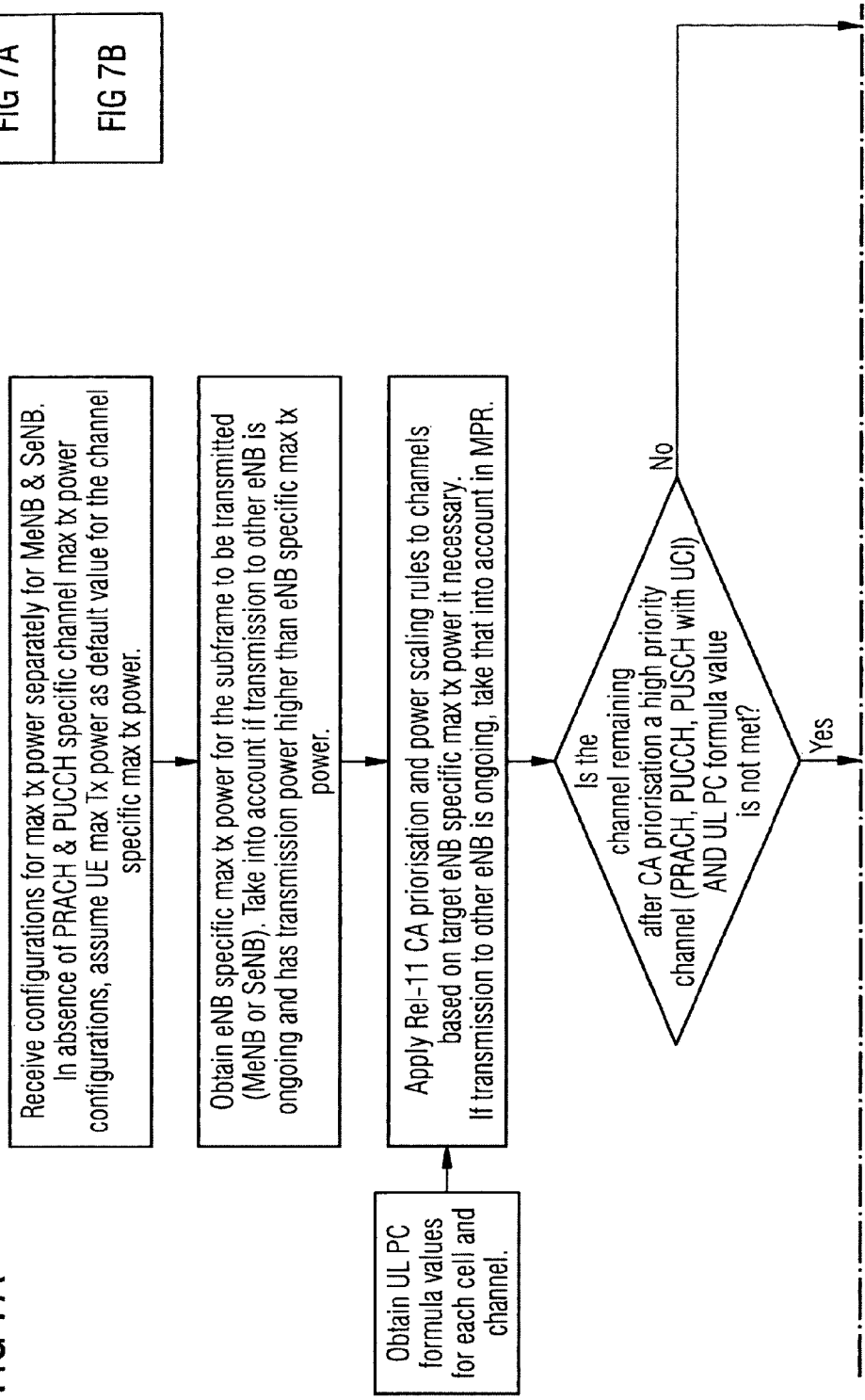

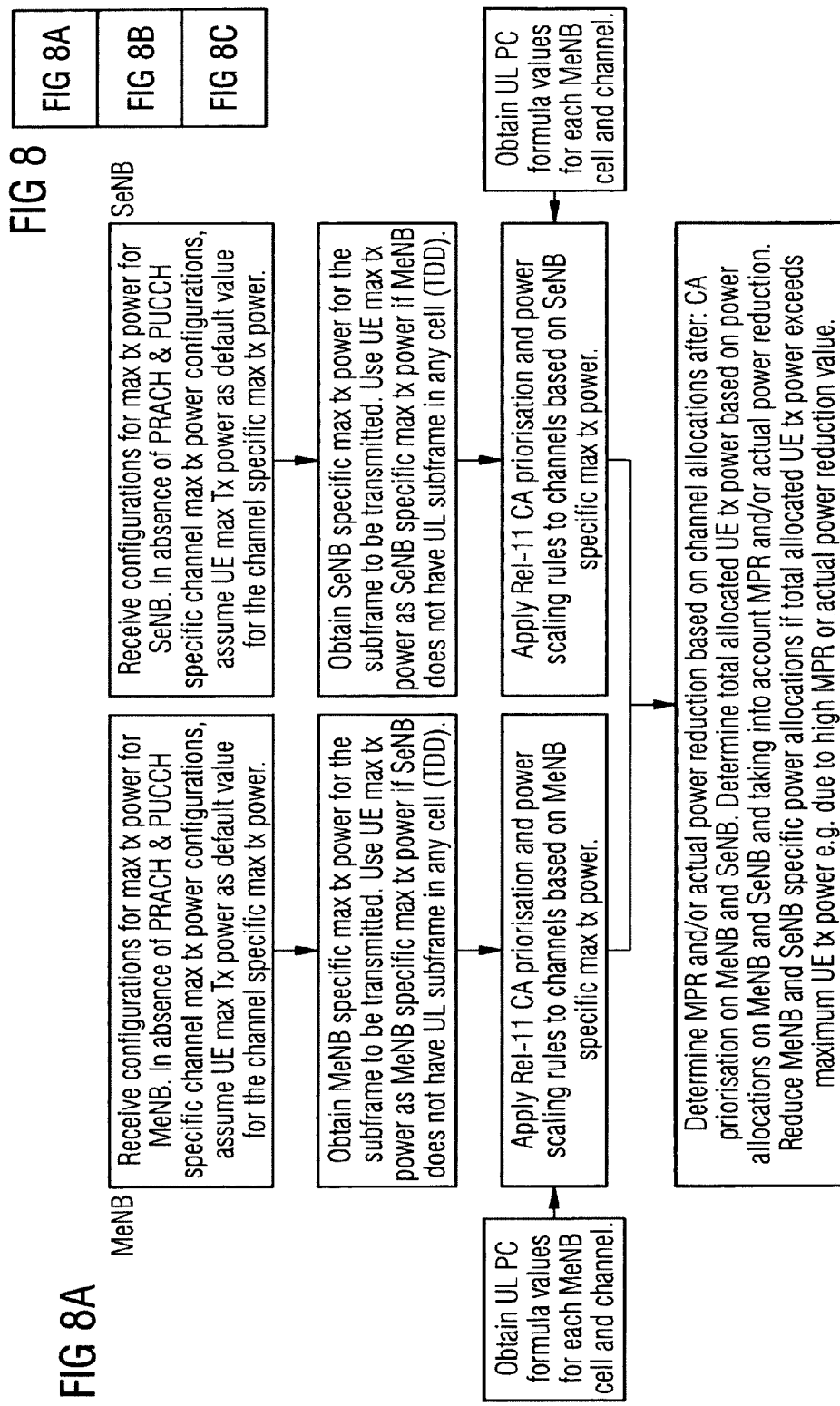

POWER CONTROL FOR TRANSMISSIONS TO FIRST AND SECOND BASE STATIONS

This disclosure relates to methods and apparatus, and in particular but not exclusively, to methods and apparatus for controlling data transmissions in a communication network.

A communication system can be seen as a facility that enables communication sessions between two or more nodes such as fixed or mobile devices, machine-type terminals, access nodes such as base stations, servers and so on. A communication system and compatible communicating entities typically operate in accordance with a given standard or specification which sets out what the various entities associated with the system are permitted to do and how that should be achieved. For example, the standards, specifications and related protocols can define the manner how devices shall communicate, how various aspects of communications shall be implemented and how devices for use in the system shall be configured.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a device such as a user equipment is used for enabling receiving and transmission of communications such as speech and content data.

Communications can be carried on wireless carriers. Examples of wireless systems include public land mobile networks (PLMN) such as cellular networks, satellite based communication systems and different wireless local networks, for example wireless local area networks (WLAN). In wireless systems a communication device provides a transceiver station that can communicate with another communication device such as e.g. a base station of an access network and/or another user equipment. The two directions of communications between a base station and communication devices of users have been conventionally referred to as downlink and uplink. Downlink (DL) can be understood as the direction from the base station to the communication device and uplink (UL) the direction from the communication device to the base station.

According to an aspect there is provided a method comprising receiving at a user equipment first power information for transmitting to a first base station, receiving at the user equipment second power information for transmitting to a second base station, causing said user equipment to transmit to said first base station with a first power less than or equal to a first maximum power dependent on said first power information and causing said user equipment to transmit to said second base station with a second power less than or equal to a second maximum power dependent on said second power information, such that said first and second power does not exceed a total power allowed for said user equipment.

The method may comprise receiving an offset parameter which defines the first maximum power with respect to the second maximum power.

The first base station may be a master base station and the second base station is a secondary base station.

The first power information may include first channel power information.

The method may comprise causing said user equipment to transmit on a first channel to the first base station with a power less than or equal to a first maximum channel power dependent on said first channel power information.

The channel may be at least one of a physical uplink shared channel, a physical uplink control channel, a physical random access channel or a channel comprising a sounding reference signal.

The method may comprise generating a power headroom report for at least one of first or second base station based on the power information received for that respective base station.

The method may comprise receiving from a base station carrier aggregation power information and causing said user equipment to transmit to said base station with a power additionally dependent on said carrier aggregation power information.

The method may comprise causing the user equipment to configure a minimum power level dependent on said first power information.

The method may comprise causing the user equipment to transmit only uplink control information to the first base station if the power of a channel that carries both uplink control information and uplink data is scaled below the minimum power level.

The method may comprise, if a transmission to the first base station has a higher priority than transmission to the second base station, increasing the said first power to a modified first power, decreasing the said second power to a modified second power if said first and second power exceeds a total power allowed for said user equipment, causing the user equipment to transmit to the first base station at the modified first power and causing the user equipment to transmit to the second base station at the modified second power, such said modified first and second power does not exceed a total power allowed for said user equipment.

The method may comprise causing the user equipment to transmit a subframe to the first base station at the modified first power and to transmit to a second base station at least one of subsequent or overlapping subframes at the modified second power.

The method may comprise causing the user equipment to cease transmission of at least one channel to the second base station if a transmission to the first base station of a higher priority than transmission to the second base station is being transmitted to the first base station at a modified first power.

The method may comprise, in the absence of transmission to the second base station, increasing the first power to a modified first power, causing said user equipment to transmit to the first base station such that the modified first power does not exceed a total power allowed for said user equipment.

The method may comprise causing the user equipment to transmit to said first base station and to said second base station if said first and second power does not exceed a total power allowed for said user equipment, causing the user equipment to transmit only to said first base station if said first and second power exceeds a total power allowed for said user equipment and reserving a subframe for a transmission to said second base station.

The method may comprise determining a subframe to be said subframe reserved for a transmission to said second base station at least partially based on at least one of round trip time of synchronous HARQ process; shortest round trip time of asynchronous HARQ; periodic resource allocation.

According to another aspect, there is provided an apparatus, said apparatus comprising at least one processor and at least one memory including computer code for one or more programs, the at least one memory and the computer code configured, with the at least one processor, to cause the apparatus at least to receive at a user equipment first power information for transmitting to a first base station, receive at the user equipment second power information for transmitting to a second base station, cause said user equipment to transmit to said first base station with a first power less than or equal to a first maximum power dependent on said first power information and cause said user equipment to transmit to said second base station with a second power less than or equal to a second maximum power dependent on said second power information, such that said first and second power does not exceed a total power allowed for said user equipment.

The at least one processor and at least one memory may be configured to receive an offset parameter which defines the first maximum power with respect to the second maximum power.

The first base station may be a master base station and the second base station is a secondary base station.

The first power information may include first channel power information.

The at least one processor and at least one memory may be configured to cause said user equipment to transmit on a first channel to the first base station with a power less than or equal to a first maximum channel power dependent on said first channel power information.

The channel may be at least one of a physical uplink shared channel, a physical uplink control channel, a physical random access channel or a channel comprising a sounding reference signal.

The at least one processor and at least one memory may be configured to generate a power headroom report for at least one of first or second base station based on the power information received for that respective base station.

The at least one processor and at least one memory may be configured to receive from a base station carrier aggregation power information and causing said user equipment to transmit to said base station with a power additionally dependent on said carrier aggregation power information.

The at least one processor and at least one memory may be configured to cause the user equipment to configure a minimum power level dependent on said first power information.

The at least one processor and at least one memory may be configured to cause the user equipment to transmit only uplink control information to the first base station if the power of a channel that carries both uplink control information and uplink data is scaled below the minimum power level.

The at least one processor and at least one memory may be configured to, if a transmission to the first base station has a higher priority than transmission to the second base station, increase the said first power to a modified first power, decreasing the said second power to a modified second power if said first and second power exceeds a total power allowed for said user equipment, causing the user equipment to transmit to the first base station at the modified first power and causing the user equipment to transmit to the second base station at the modified second power, such said modified first and second power does not exceed a total power allowed for said user equipment.

The at least one processor and at least one memory may be configured to cause the user equipment to transmit a subframe to the first base station at the modified first power and to transmit to a second base station at least one of subsequent or overlapping subframes at the modified second power.

The at least one processor and at least one memory may be configured to cause the user equipment to cease transmission of at least one channel to the second base station if a transmission to the first base station of a higher priority than transmission to the second base station is being transmitted to the first base station at a modified first power.

The at least one processor and at least one memory may be configured to, in the absence of transmission to the second base station, increase the first power to a modified first power, causing said user equipment to transmit to the first base station such that the modified first power does not exceed a total power allowed for said user equipment.

The at least one processor and at least one memory may be configured to cause the user equipment to transmit to said first base station and to said second base station if said first and second power does not exceed a total power allowed for said user equipment, causing the user equipment to transmit only to said first base station if said first and second power exceeds a total power allowed for said user equipment and reserving a subframe for a transmission to said second base station.

The at least one processor and at least one memory may be configured to determine a subframe to be said subframe reserved for a transmission to said second base station at least partially based on at least one of round trip time of synchronous HARQ process; shortest round trip time of asynchronous HARQ; periodic resource allocation.

According to another aspect, there is provided an apparatus, said apparatus comprising means for causing the apparatus to receive at a user equipment first power information for transmitting to a first base station, receive at the user equipment second power information for transmitting to a second base station, means for causing said user equipment to transmit to said first base station with a first power less than or equal to a first maximum power dependent on said first power information and means for causing said user equipment to transmit to said second base station with a second power less than or equal to a second maximum power dependent on said second power information, such that said first and second power does not exceed a total power allowed for said user equipment.

The apparatus may comprise means for receiving an offset parameter which defines the first maximum power with respect to the second maximum power.

The first base station may be a master base station and the second base station is a secondary base station.

The first power information may include first channel power information.

The apparatus may comprise means for causing said user equipment to transmit on a first channel to the first base station with a power less than or equal to a first maximum channel power dependent on said first channel power information.

The channel may be at least one of a physical uplink shared channel, a physical uplink control channel, a physical random access channel or a channel comprising a sounding reference signal.

The apparatus may comprise means for generating a power headroom report for at least one of first or second base station based on the power information received for that respective base station.

The apparatus may comprise means for receiving from a base station carrier aggregation power information and causing said user equipment to transmit to said base station with a power additionally dependent on said carrier aggregation power information.

The apparatus may comprise means for causing the user equipment to configure a minimum power level dependent on said first power information.

The apparatus may comprise means for causing the user equipment to transmit only uplink control information to the first base station if the power of a channel that carries both uplink control information and uplink data is scaled below the minimum power level.

The apparatus may comprise, if a transmission to the first base station has a higher priority than transmission to the second base station, means for increasing the said first power to a modified first power, decreasing the said second power to a modified second power if said first and second power exceeds a total power allowed for said user equipment, causing the user equipment to transmit to the first base station at the modified first power and causing the user equipment to transmit to the second base station at the modified second power, such said modified first and second power does not exceed a total power allowed for said user equipment.

The apparatus may comprise means for causing the user equipment to transmit a subframe to the first base station at the modified first power and to transmit to a second base station at least one of subsequent or overlapping subframes at the modified second power.

The apparatus may comprise means for causing the user equipment to cease transmission of at least one channel to the second base station if a transmission to the first base station of a higher priority than transmission to the second base station is being transmitted to the first base station at a modified first power.

The apparatus may comprise, in the absence of transmission to the second base station, means for increasing the first power to a modified first power, causing said user equipment to transmit to the first base station such that the modified first power does not exceed a total power allowed for said user equipment.

The apparatus may comprise means for causing the user equipment to transmit to said first base station and to said second base station if said first and second power does not exceed a total power allowed for said user equipment, causing the user equipment to transmit only to said first base station if said first and second power exceeds a total power allowed for said user equipment and reserving a subframe for a transmission to said second base station.

The apparatus may comprise means for determining a subframe to be said subframe reserved for a transmission to said second base station at least partially based on at least one of round trip time of synchronous HARQ process; shortest round trip time of asynchronous HARQ; periodic resource allocation.

A computer program comprising program code means adapted to perform the method(s) may also be provided. The computer program may be stored and/or otherwise embodied by means of a carrier medium.

Reference is now made by way of example to the accompanying drawings in which.

Figure 5:
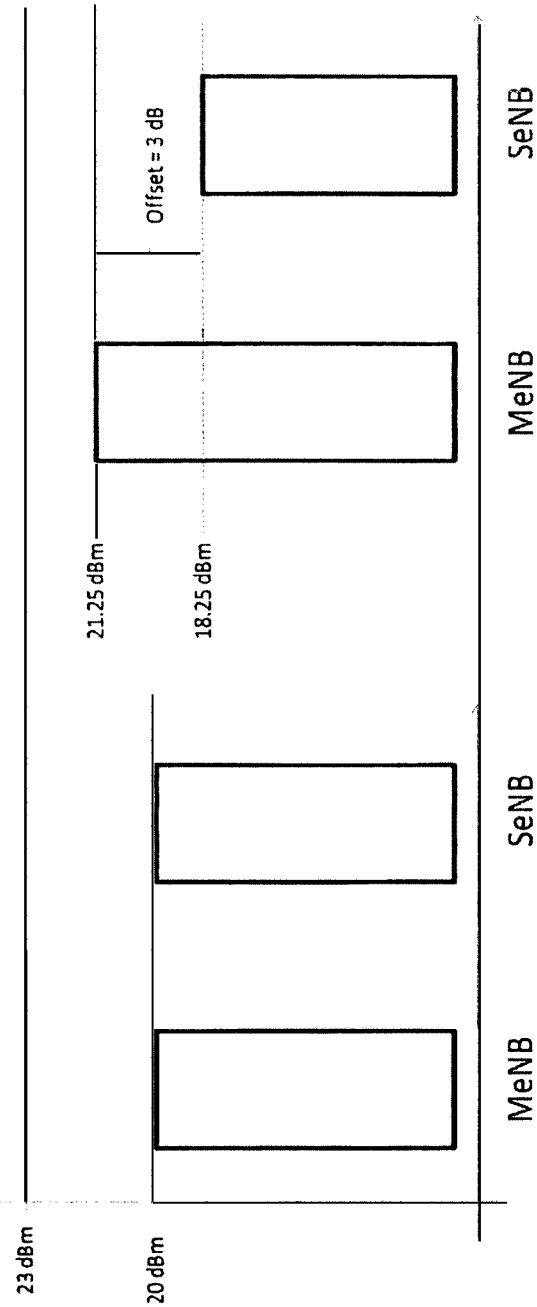
Figure 6:
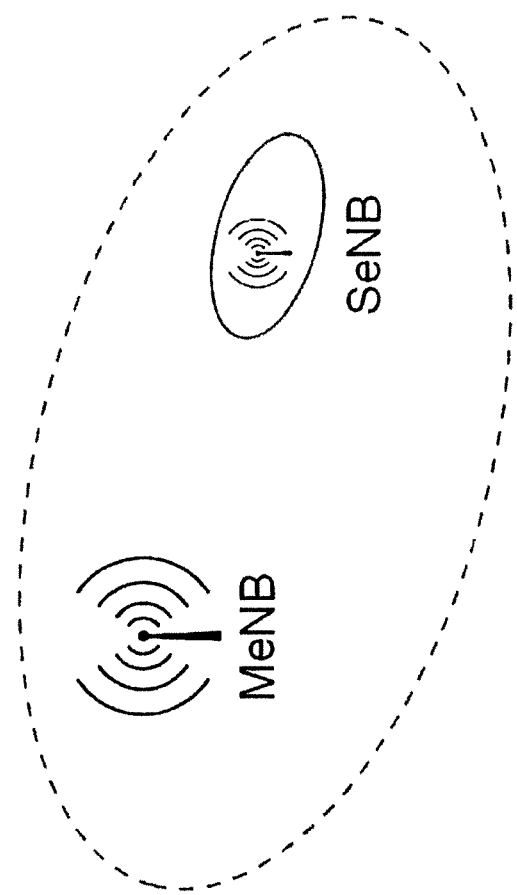
Figure 7B:
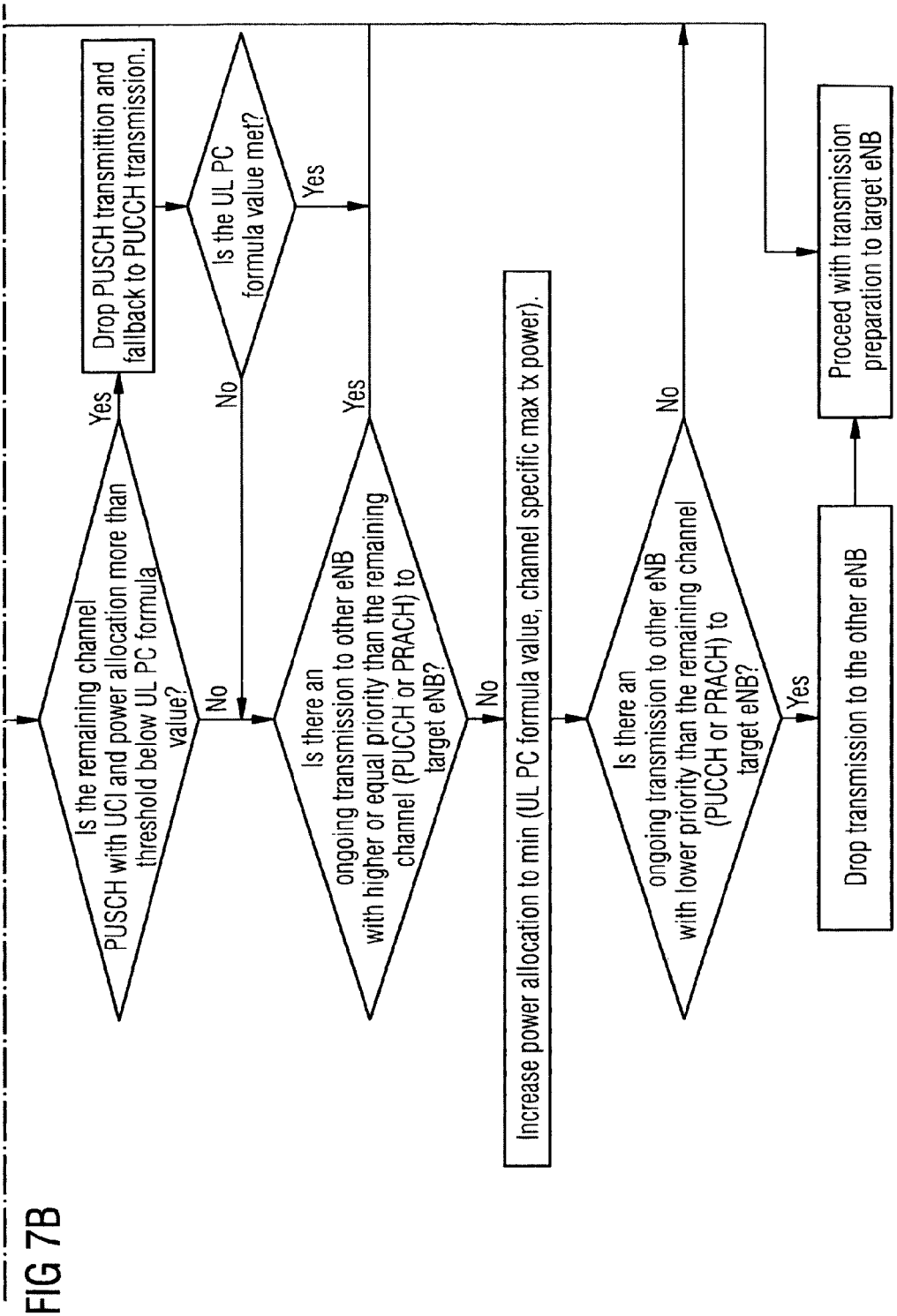
Figure 8B:
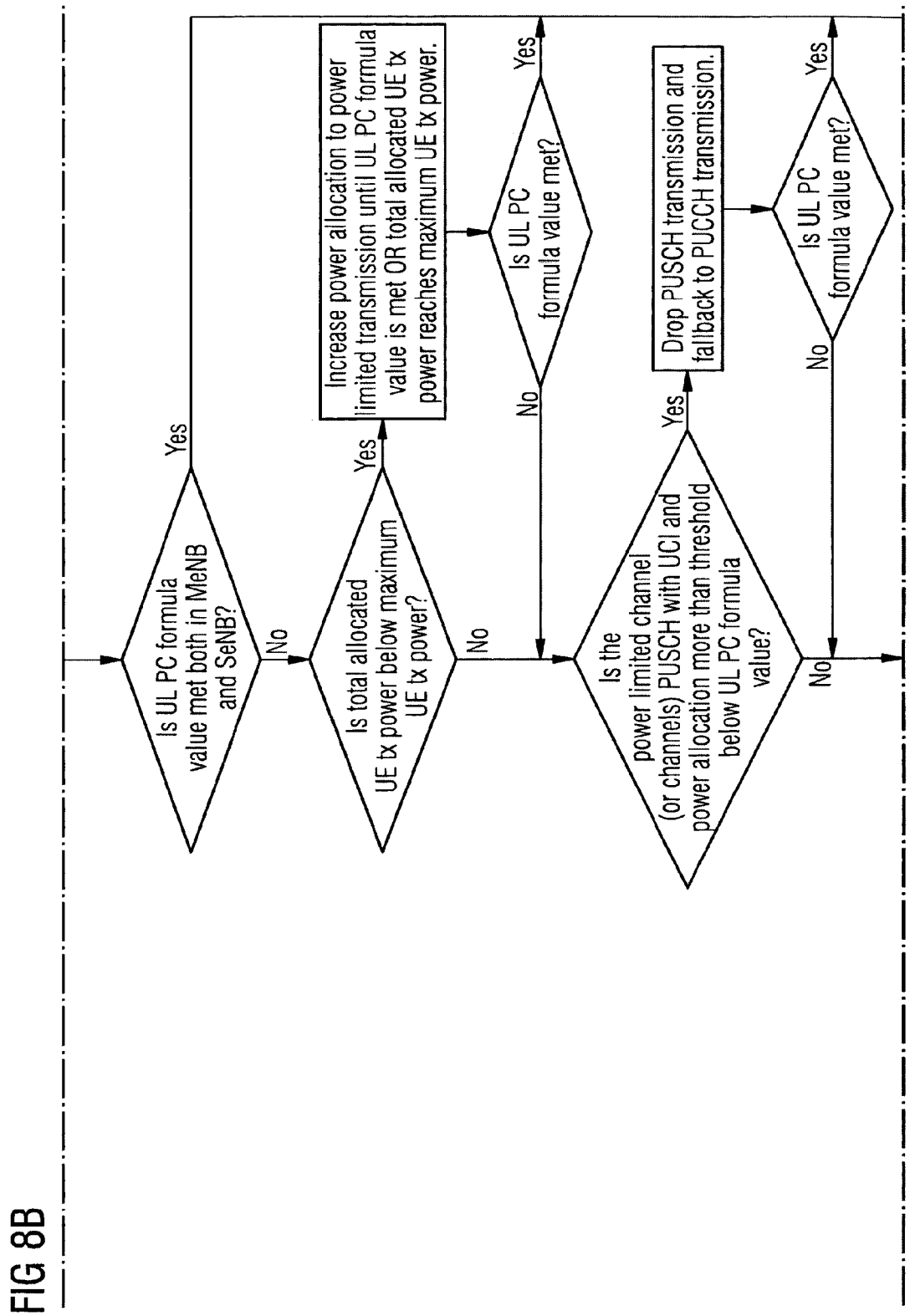
Figure 8C:
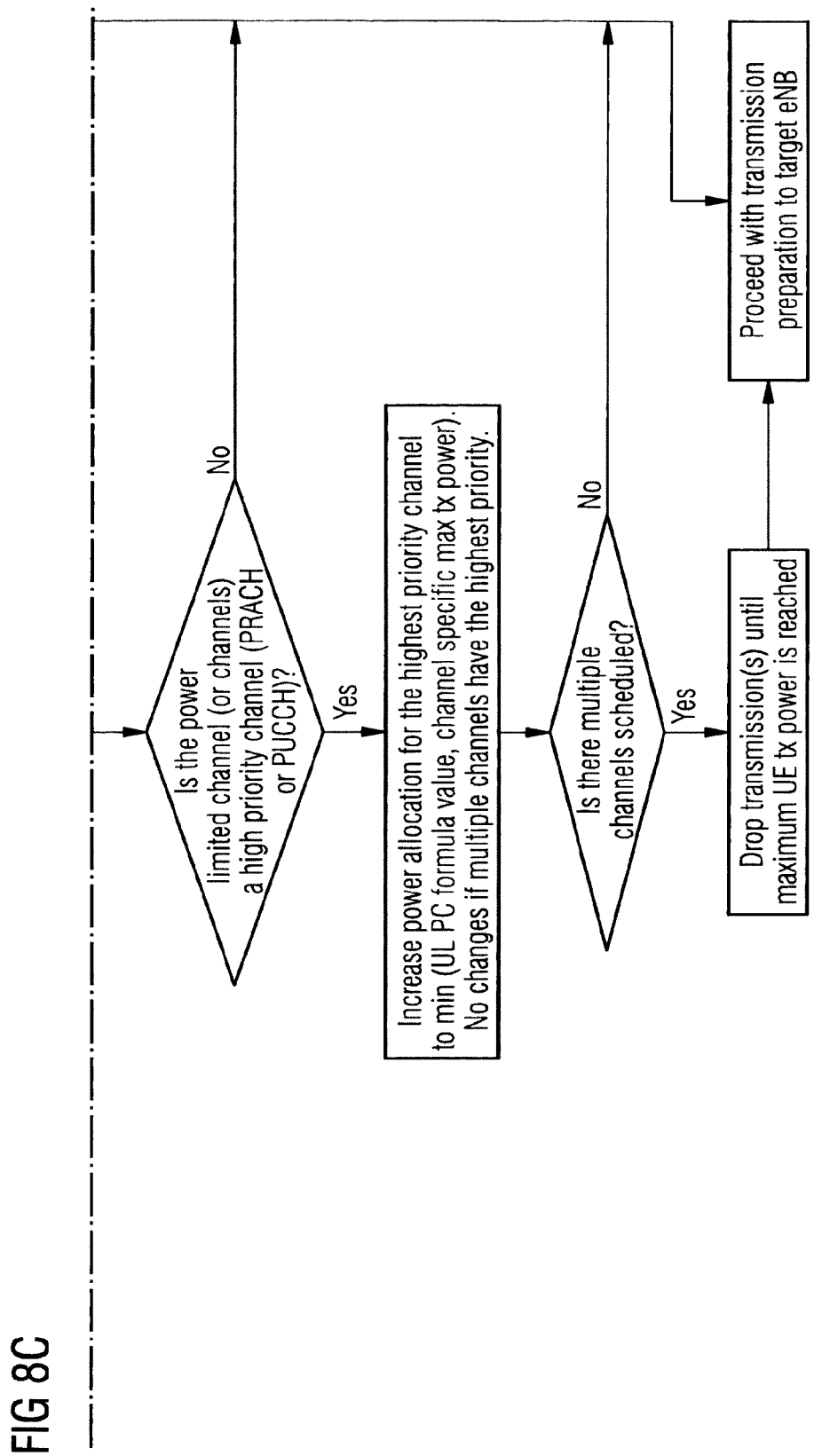

FIG. 5*a* shows a graphical representation of power resource allocation;

FIG. 5*b* shows a graphical representation of an alternative power resource allocation;

FIG. 6 shows a schematic diagram of two base stations;

FIG. 7 shows a method of configuring power allocation in a user equipment;

FIG. 8 shows a method of configuring power allocation in a user equipment.

In the following certain exemplifying embodiments are explained with reference to a wireless or mobile communication system serving mobile communication devices. Before explaining in detail the exemplifying embodiments, certain general principles of a wireless communication system and mobile communication devices are briefly explained with reference to FIGS. 1 to 2 to assist in understanding the technology underlying the described examples.

In a wireless communication system 100 mobile communication devices or user equipment (UE) 102, 103, 105 are provided wireless access via at least one base station or similar wireless transmitting and/or receiving node or point.

Figure 1:
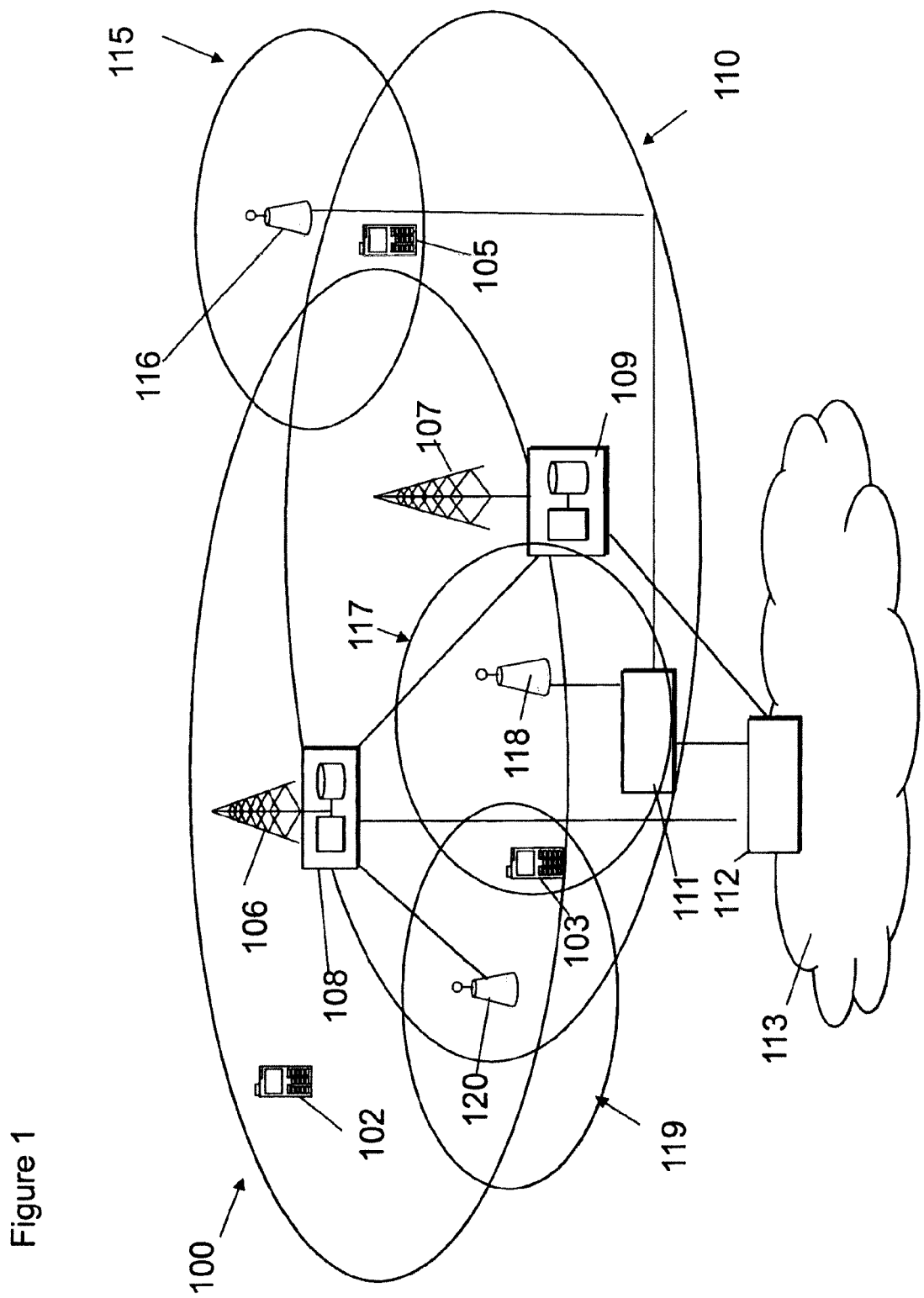
FIG. 1 shows a schematic diagram of a communication system comprising a base station and a plurality of communication devices.

In a LTE system, base stations are typically controlled by at least one appropriate controller apparatus, so as to enable operation thereof and management of mobile communication devices in communication with the base stations. The controller apparatus may be part of the base station. In FIG. 1 control apparatus 108 and 109 are shown to control the respective macro base stations 106 and 107. The control apparatus of a base station can be interconnected with other control entities. In FIG. 1 base stations 106 and 107 are shown as connected to a wider communications network 113 via gateway 112. A further gateway function may be provided to connect to another network. The smaller base stations 116, 118 and 120 may also be connected to the network 113, for example by a separate gateway function and/or via the controllers of the macro stations. In the example, stations 116 and 118 are connected via a gateway 111 whilst station 120 connects via the controller apparatus 108. In some embodiments, the smaller stations may not be provided.

Figure 2:
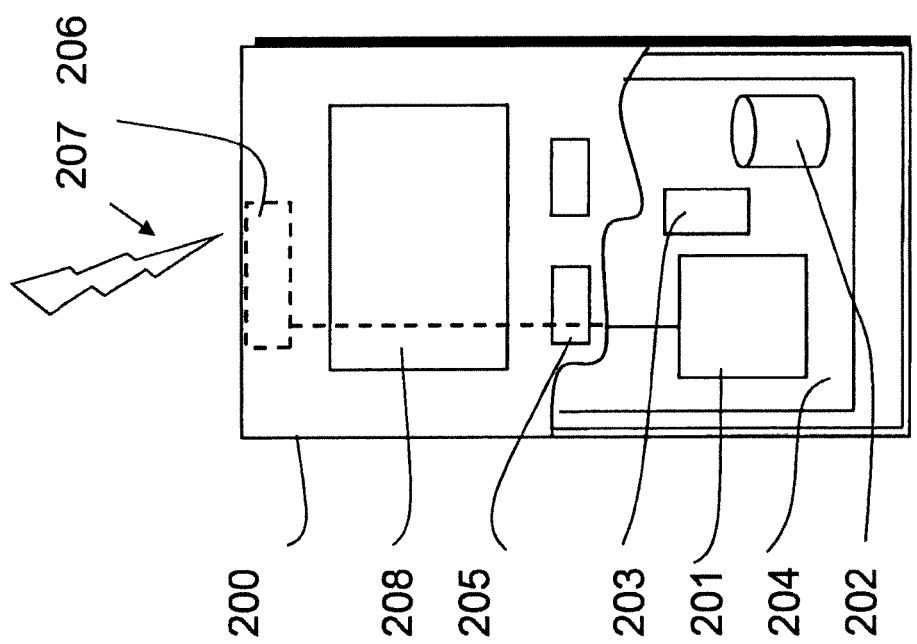
FIG. 2 shows a schematic diagram of a mobile communication device according to some embodiments.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 103, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW may be separated and they are not required to be co-located.

Figure 3:
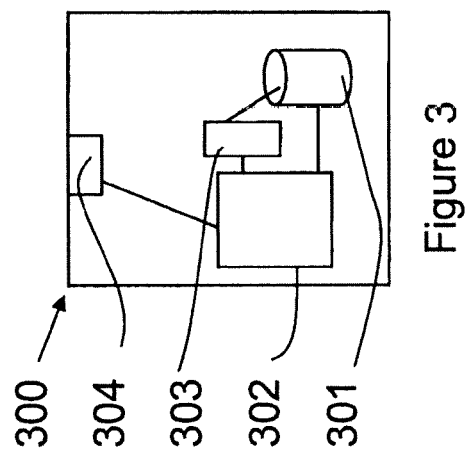
FIG. 3 shows a control apparatus of a base station.

FIG. 3 shows an example of a control apparatus for a communication system, for example to be coupled to and/or for controlling a station of an access system, such as a base station. In some embodiments, base stations comprise a separate control apparatus. In other embodiments, the control apparatus can be another network element such as a radio network controller. In some embodiments, each base station may have such a control apparatus as well as a control apparatus being provided in a radio network controller.

The control apparatus 109 can be arranged to provide control on communications in the service area of the system. The control apparatus 109 comprises at least one memory 301, at least one data processing unit 302, 303 and an input/output interface 304. Via the interface the control apparatus can be coupled to a receiver and a transmitter of the base station. For example the control apparatus 109 can be configured to execute an appropriate software code to provide the control functions which allow communication between the base stations.

In some releases of 3GPP specifications, a UE may be connected to both a Master eNB (MeNB) and a Secondary eNB (SeNB) at the same time. Radio resources of the UE are controlled by two distinct schedulers, located in the MeNB and the SeNB. This is known as Dual Connectivity.

Release 12 3GPP work item "Dual Connectivity for LTE" [RP-132069] is under development in RAN2 and RAN1. A multiple Rx/Tx (Receiver/Transmitter) UE may be, in the RRC_CONNECTED state, configured to utilise radio resources provided by two distinct schedulers located in MeNBs and SeNBs. The backhaul link between the MeNB and SeNB is non-ideal so that signalling delay between the eNBs can be about 20 ms and the bit rate is limited.

A dual-connectivity UE should be capable of sending uplink control information (UCI), such as HARQ-ACKs (Hybrid Automatic Repeat Request Acknowledgement) and CSI (Channel State Information) as well as higher layer control information, to both the MeNB and the SeNB because of the delays in the backhaul between the MeNB and the SeNB. The UE may transmit UCI to only one of the eNBs at a time by assuming some scheduling restrictions (assuming a synchronised network).

A situation is also considered where there are no scheduling restrictions between the MeNB and the SeNB. In this case, the UE may then use a carrier aggregation type of operation between cells in MeNB and SeNB and may send UCI as well as other control information and data simultaneously in the Primary cell (Pcell) MeNB and in the Secondary cell (Scell) in SeNB. Similarly to an inter-band carrier aggregation case, the UE may have separate transmission chains including Power Amplifiers (PAs) for transmissions to MeNB and SeNB. The PAs are capable of transmitting with full transmission (tx) power, as defined by UE power class, in the case where resources of MeNB only or SeNB only are utilized. However, independent schedulers at the MeNB and SeNB could allocate UL resources so that the UE would exceed tx power limits set, for example, by regulatory limits.

Figure 4:
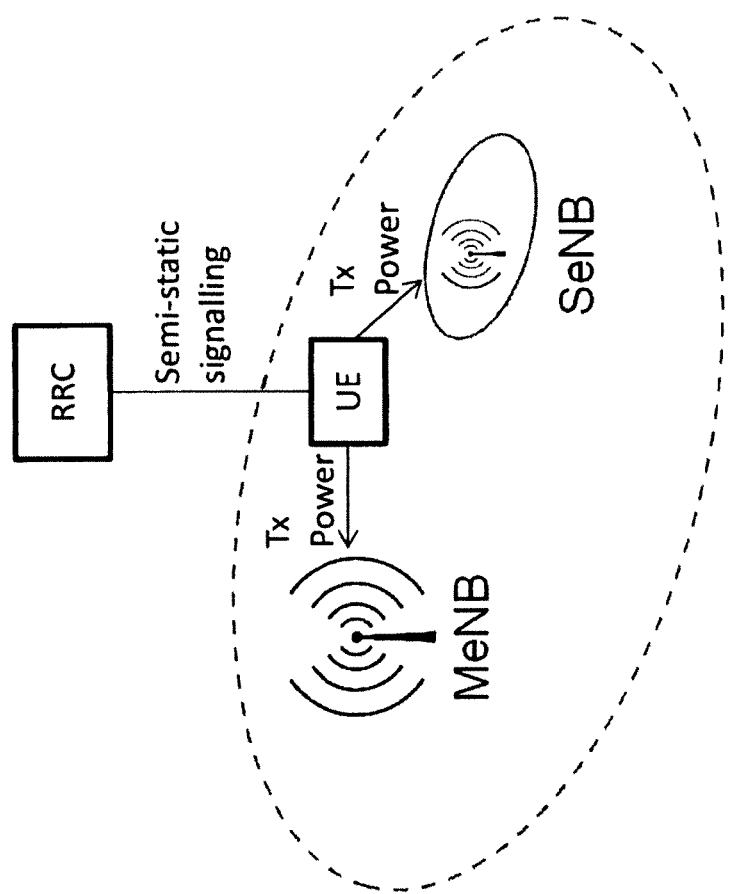
FIG. 4 shows a schematic diagram of a user equipment communicating with two base stations.

To keep the total tx power within limits, set, for example, by a regulator, the mechanism shown in FIG. 4 may be implemented when a UE is configured for dual connectivity operation. The maximum UL tx power to SeNB and MeNB is semi-statically configured (UE specific configuration via e.g. dedicated RRC signalling). It is assumed that the UE has separate transmitter chains including Power Amplifiers (PAs) for SeNB and MeNB respectively and that both may be dimensioned in such a way that they can provide the allowed maximum transmission power alone.

Typically the UE UL tx power configuration is such that the UE cannot exceed the allowed total tx power (e.g. UE with 23 dBm or 200 mW power class could be configured to divide the power so that 25 mW is max power to SeNB and 75 mW is max tx power to MeNB). Part of the total tx power may be reserved for a typical MPR value (e.g. 100 mW in this example).

An example of the power allocation is given in FIGS. 5a and 5b. It assumes that the maximum tx power of the UE (given by regulator) is 23 dBm (=200 mW). In the baseline scenario shown in FIG. 5a, the available maximum tx power is divided evenly between MeNB and SeNB. In one embodiment, shown in FIG. 5b, the available maximum Tx power resource is divided unevenly between MeNB and SeNB: there is a predefined offset (3 dB in this example) between Tx power of MeNB and SeNB.

FIG. 6 illustrates a case in which the eNB Tx power of the MeNB is significantly larger than the Tx power of the SeNB. Consequently, the DL coverage area of MeNB is larger than that of SeNB. However, the UL coverage area of MeNB and SeNB are similar, as the UL coverage primarily depends on the UL power and the eNB sensitivity. There should be sufficient means available to balance the UL coverage (and transmit power) between MeNB and SeNB to achieve sufficient UL coverage of the MeNB without a bottleneck. In some configurations, the difference in maximum UL transmit power levels is equal to the difference in DL transmit power levels of MeNB and SeNB. This results in the DL and UL coverage areas of MeNB and SeNB being balanced.

There are different ways to control the power sharing between MeNB and SeNB. One approach is to control it by means of an Offset parameter, which can be configured via higher layers. The offset parameter may define the maximum Tx power of SeNB with respect to the MeNB.

Table 1 shows maximum Tx power values (dBm) for MeNB and SeNB with different exemplary values of the Offset parameter. 23 dBm is the value assumed for the maximum Tx power in this example.

TABLE 1

| Offset (dB) | Max. Tx power (dBm) | |
|---|---|---|
| | MeNB | SeNB |
| 0 | 20.0 | 20.0 |
| 1 | 20.5 | 19.5 |
| 2 | 20.9 | 18.9 |
| 3 | 21.2 | 18.2 |
| 4 | 21.6 | 17.6 |
| 6 | 22.0 | 16.0 |
| 10 | 22.6 | 12.6 |

This method provides means to balance the UL coverage between MeNB and SeNB for 2Tx/2Rx UEs. Scheduling of the UL resources is simpler because the Tx power available for a scheduler at the given eNB is fixed.

In addition to the MeNB and SeNB specific tx power limit, channel specific power limits could also be configured. The MeNB or SeNB specific limit may be applied to PUSCH (Physical Uplink Shared Channel) and SRS (Sounding Reference Signal) but not applied to PUCCH (Physical Uplink Control Channel) or PRACH (Physical Random Access Channel). A separate max tx power limit could be assigned for PUCCH or PRACH. In some embodiments, the PRACH/PUCCH max tx power limit may be eNB specific. The semi-statically configured maximum eNB specific tx power may be used when determining PUSCH tx power.

The semi-statically configured maximum eNB specific tx power limit may be used when the UE calculates the power headroom report. The power headroom reports provide useful information because the reported value does not depend on scheduling decisions in the other eNB. The eNB receiving the PH report knows how much of the uplink resources and total UE tx power was used for transmission to the other eNB.

Some UL power control prioritisation and scaling rules assume that UCI is sent only on Pcell in the case of CA. To support the case where UCI is simultaneously transmitted on Scell, if CA is used in MeNB or SeNB in addition to dual connectivity, the UE may first apply UL tx power allocation rules described above for dual connectivity and then apply the power scaling rules defined for CA within the MeNB and/or SeNB.

If the UE is transmitting PUSCH with UCI (e.g. HARQ-ACK and/or CSI) and has to scale down power, a fallback operation could be specified where only UCI i.e. PUCCH is transmitted in pre-defined resources. There may be a pre-defined or configurable power threshold (e.g. relative to the amount of power reduction) to trigger such fallback operation.

Some UL power control prioritization and scaling rules are based on subframe level power adjustment. In the case of dual connectivity, transmissions at MeNB and SeNB may not be synchronized, i.e. subframe boundaries may not be aligned, so that scaling and prioritization rules that are subframe specific are not suitable. As shown in FIG. 7, in the case of asynchronous SeNB and MeNB, if the UE transmits a higher priority UL channel (e.g. PUCCH or PUSCH with UCI) and UL PC (Power Control) formula indicates a higher Tx power than is configured for power division between MeNB and SeNB, the UE may be allowed to exceed the limit and scale down the power for the other eNB in the following and/or overlapping subframe. If the UE has ongoing transmission of lower priority traffic for the other eNB, the ongoing transmission is dropped. If multiple channels are simultaneously transmitted for the other eNB, part of them may be dropped.

In this, asynchronous, case, strict power division between the MeNB and the SeNB may be configured so that the UE does not have to take into consideration power control in the other eNB when determining UL tx power. The UE would thus not have to consider potential high priority transmissions starting later in the other eNB. Tighter UE processing times can thus be avoided and current Rel-10 CA power scaling and prioritisation could be used without modification.

In the asynchronous case, another way to control the power sharing between MeNB and SeNB may be to share the transmission power in time. In this embodiment, when the UE receives an uplink scheduling grant from eNB to a given subframe or if UE determines a need to transmit e.g. a scheduling request, random access preamble, or PDSCH HARQ-ACK feedback to eNB on a given subframe, the UE determines the transmission power according to power control rules where the maximum tx power is assumed to be UE's full tx power as defined by UE power class. If the UE has an ongoing transmission to the other, second, eNB that partially precedes and partially overlaps with the given subframe to the first eNB, and if the UE would exceed the total tx power limit, the UE will not transmit to the first eNB but continue the transmission to the second eNB. The UE determines the expected subframe for the retransmission of the dropped transmission to the first eNB.

The UE reserves the expected retransmission subframe for a transmission to the first eNB. The UE also reserves a share of transmission power based on the transmission power that was determined for the dropped transmission. If UE determines a need, e.g. based on scheduling grant, to transmit to the second eNB on a subframe that partially precedes and partially overlaps with the subframe reserved for the first eNB, UE determines the transmission power according to power control rules where the maximum tx power is assumed to be UE's full tx power as defined by UE power class. If the combined transmission power to the first and second eNB would exceed total tx power limit, UE will not transmit to the second eNB but UE determines the expected subframe for the retransmission of the dropped transmission to the second eNB. The UE determines whether or not to transmit to the first eNB on the first reserved subframe, as well as the transmission power, according to the normal mechanisms and procedures controlling UE transmissions.

In other words, if UE has reserved a subframe for a transmission to a first base station, the UE transmits to a second base station on an at least a partially overlapping subframe, if a first power determined for a transmission to the first base station in another subframe and a second power determined for a transmission to the second base station does not exceed a total power allowed for the UE. If the first power and the second power exceed a total power allowed for the UE, UE will not transmit to the second base station and reserves a subframe for the second base station. It should be noted that at this phase, UE does not yet necessarily have information whether or not it will transmit to the first base station on the subframe reserved for the first base station.

When the UE determines whether the transmission on the partially preceding and partially overlapping subframe or the expected retransmission on the reserved subframe is dropped, the UE may drop the transmission with lower UL channel priority.

The UE can determine the expected subframe for the retransmission of the dropped transmission based on synchronous HARQ round trip time, as e.g. in the case of PUSCH, based on the shortest round trip time of asynchronous HARQ, as e.g. in the case of PDSCH HARQ-ACK transmission, based on the periodic resource allocation, as e.g. in the case of scheduling request, or based on the random access procedure as e.g. in the case of random access preamble.

This allows MeNB signals to be prioritised over SeNB signals if the transmissions exceed the allowed power without requiring a shorter processing time in the UE.

In the case that MeNB and SeNB are synchronized (or the UE is capable of processing UL grants faster and knows the following subframe scheduling in advance), if there is no UL transmission in the other eNB, the UE can use all the tx power (e.g. 23 dBm) in one of the eNBs (but the PH report would be negative). If there is excess tx power reserve reserved for the other eNB, the UE can use all the available tx power for the other eNB (but the PH report would be negative also in this case).

As shown in FIG. 7, in the case of synchronised MeNB and SeNB, if the UE transmits a higher priority UL channel (e.g. PRACH, PUCCH or PUSCH with UCI) and UL PC formula indicates a higher power than is configured for power division between MeNB and SeNB, the UE may be allowed to exceed the limit (up to channel specific limit if configured) and scale down the power of lower priority traffic in the other eNB.

In addition to maximum eNB specific power, minimum eNB specific power limit could be configured so that there is always possibility to send, for example, 1 PRB (Physical Resource Block) on PUSCH, PUCCH or SRS even if there is high priority traffic at the other eNB.

Optimal UL tx power usage at the UE can be supported so that unnecessary power scaling and/or channel dropping can be avoided. Furthermore, the UL resources of one of the eNBs cannot be completely overruled by a higher priority transmission at the other eNB.

If TDD (Time Division Duplexing) is used in one of the eNBs and FDD (Frequency Division Duplexing) in the other eNB (e.g. TDD SeNB and FDD MeNB), semi-static power allocation is only considered in the subframes where TDD UL is possible. In the case of eIMTA (enhanced Interference Mitigation and Traffic Adaptation), possible TDD UL subframes can be determined according to TDD SIB1 signalled UL/DL configuration or according to valid DCI signalled UL/DL configuration. The eNB may signal the selection between these two options. Selection may be based on backhaul latency.

The control apparatus that would configure MeNB and SeNB specific maximum UL tx power may in the MeNB. The required data processing apparatus and functions of a base station apparatus, a communication device, and any other appropriate apparatus may be provided by means of one or more data processors. The described functions may be provided by one or more processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory. In general, the various embodiments may be implemented in hardware or special purpose circuits, software, logic or any combination thereof.

Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A method comprising:
   receiving at a user equipment first power information for transmitting to a first base station;
   receiving at the user equipment second power information for transmitting to a second base station, wherein a transmission to the first base station has a higher priority than transmission to the second base station;
   causing said user equipment to transmit to the first base station with a first power less than or equal to a first maximum power dependent on said first power information;
   causing said user equipment to transmit to said second base station with a second power less than or equal to a second maximum power dependent on said second power information, where said user equipment determines adjustment for said first power and/or said second power based at least partially upon a total power allowed for said user equipment such that said first and second power does not exceed the total power allowed for said user equipment;
   increasing the said first power to a modified first power;
   decreasing the said second power to a modified second power if said first and second power exceeds a total power allowed for said user equipment;
   causing the user equipment to transmit to the first base station at the modified first power; and
   causing the user equipment to transmit to the second base station at the modified second power, such that said modified first and second power does not exceed a total power allowed for said user equipment.

2. The method according to claim 1, further comprising:
   receiving an offset parameter which defines a first maximum power with respect to a second maximum power.

3. The method according to claim 1, wherein the first power information includes first channel power information.

4. The method according to claim 3, comprising
   causing said user equipment to transmit on a first channel to the first base station with a power less than or equal to a first maximum channel power dependent on said first channel power information.

5. The method according to claim 4, wherein the channel is at least one of a physical uplink shared channel, a physical uplink control channel, a physical random access channel or a channel comprising a sounding reference signal.

6. The method according to claim 1, comprising generating a power headroom report for at least one of first or second base station based on the power information received for that respective base station.

7. The method according to claim 1, comprising receiving from a base station carrier aggregation power information; and
   causing said user equipment to transmit to said base station with a power additionally dependent on said carrier aggregation power information.

8. The method according to claim 1, comprising causing the user equipment to configure a minimum power level dependent on said first power information, and causing the user equipment to transmit only uplink control information to the first base station if the power of a channel that carries both uplink control information and uplink data is scaled below the minimum power level.

9. The method according to claim 1, further comprising:
   causing the user equipment to transmit a subframe to the first base station at the modified first power and to transmit to a second base station at least one of subsequent or overlapping subframes at the modified second power.

10. The method according to claim 1, further comprising:
    causing the user equipment to cease transmission of at least one channel to the second base station if a transmission to the first base station of a higher priority than transmission to the second base station is being transmitted to the first base station at a modified first power.

11. The method according to claim 1, comprising, in the absence of transmission to the second base station:
    increasing the first power to a modified first power,
    causing said user equipment to transmit to the first base station such that the modified first power does not exceed a total power allowed for said user equipment.

12. The method according to claim 1, comprising causing the user equipment to transmit to said first base station and to said second base station if said first and second power does not exceed a total power allowed for said user equipment;
    causing the user equipment to transmit only to said first base station if said first and second power exceeds a total power allowed for said user equipment; and
    reserving a subframe for a transmission to said second base station.

13. The method according to claim 12, comprising determining a subframe to be said subframe reserved for a transmission to said second base station at least partially based on at least one of round trip time of synchronous HARQ process; shortest round trip time of asynchronous HARQ; periodic resource allocation.

14. A computer program recorded on a non-transitory medium comprising computer executable instructions which when run are configured to perform the method of claim 1.

15. An apparatus, said apparatus comprising at least one processor and at least one non-transitory memory including computer code for one or more programs, the at least one memory and the computer code configured, with the at least one processor, to cause the apparatus at least to:
    receive at a user equipment first power information for transmitting to a first base station;
    receive at the user equipment second power information for transmitting to a second base station, wherein a transmission to the first base station has a higher priority than transmission to the second base station;
    cause said user equipment to transmit to said first base station with a first power less than or equal to a first maximum power dependent on said first power information;
    cause said user equipment to transmit to said second base station with a second power less than or equal to a second maximum power dependent on said second power information, where said user equipment determines adjustment for said first power and/or said second power based at least partially upon a total power allowed for said user equipment such that said first and second power does not exceed the total power allowed for said user equipment;

increasing the said first power to a modified first power;

decreasing the said second power to a modified second power if said first and second power exceeds a total power allowed for said user equipment;

causing the user equipment to transmit to the first base station at the modified first power; and causing the user equipment to transmit to the second base station at the modified second power, such said modified first and second power does not exceed a total power allowed for said user equipment.

16. The apparatus according to claim 15, comprising receiving an offset parameter which defines the first maximum power with respect to the second maximum power.

17. The apparatus according to claim 15, comprising causing said user equipment to transmit on a first channel to the first base station with a power less than or equal to a first maximum channel power dependent on said first channel power information, wherein the channel is at least one of a physical uplink shared channel, a physical uplink control channel, a physical random access channel or a channel comprising a sounding reference signal.

18. The apparatus according to claim 15, comprising generating a power headroom report for at least one of first or second base station based on the power information received for that respective base station.

19. The apparatus according to claim 15, comprising receiving from a base station carrier aggregation power information; and causing said user equipment to transmit to said base station with a power additionally dependent on said carrier aggregation power information.

\* \* \* \* \*